ically be the United States Patent Office
3,430,505
Patented Mar. 4, 1969

1

3,430,505
VARIABLE-SPEED DRIVE FOR AGRICULTURAL IMPLEMENT
Klaus Oliva, Neustadt, Saxony, Christian Noack, Guttau, and Gotthard Lange, Lobau, Germany, assignors to VEB Kombinat Fortschritt, Neustadt, Saxony, Germany, a corporation of Germany
Filed June 7, 1966, Ser. No. 555,814
U.S. Cl. 74—230.17          6 Claims
Int. Cl. F16h 55/56

ABSTRACT OF THE DISCLOSURE

Variable speed drive for the beater drum of a threshing machine in which speed-reducing transmissions are connected by a clutch with a variable-speed Reeves pulley by selectively operable clutches adapted to drive the shaft of the machine directly or via the transmission.

---

Our present invention relates to a variable-speed drive for a rotatable unit of an agricultural implement such as a combine.

In the case of a beater drum of a threshing machine, for example, the operating speed should be adjustable over a wide range in order that different crops may be handled with the greatest efficiency. Variable-speed drives, e.g. of the so-called Reeves type, comprising a split double-cone driving pulley with adjustably separable halves and a similarly split driven pulley connected thereto via a V-belt, have been used in the past for this purpose. The range of variation of such speed changers is, however, limited and in some instances insufficient for a threshing machine or combine of universal utility.

It is, therefore, the general object of our invention to provide an improved transmission system for driving the shaft of a beater drum or the like with widely variable speed while utilizing a prime mover of substantially constant operating rate.

A more particular object of this invention is to provide a transmission system of this description which utilizes the conventional Reeves drive in combination with easily manipulable means for increasing the speed range thereof.

In accordance with this invention we provide a power shaft, rotated by a vehicular engine or other prime mover, on which a driven element such as a split Reeves pulley is loosely mounted, in combination with selectively operable coupling means for positively connecting this driven element with the shaft either directly or via a speed-reducing transmission.

In accordance with a more specific feature of our invention, the speed-reducing transmission includes an auxiliary shaft which, in the case of a combine, preferably extends parallel to the axis of the beater drum and which is connected with the power shaft by two step-down linkages on opposite sides of the drum, one of these linkages including the aforementioned driven element which, for this purpose, may be rigid with a hub having one or more V-grooves engaged by respective belts. Separate couplings may be provided in this instance for selectively connecting either the driven element or a corresponding element of the other step-down linkage with the power shaft carrying the drum. It is, however, also possible to locate the speed-reducing transmission on the same side of the drum as the driven element, e.g. on an outward extension of the power shaft. In the latter case a single clutch will suffice for the selective direct or indirect coupling of the driven element with the shaft.

The invention will be described in greater detail with reference to the accompanying drawings in which:

FIG. 1 is a side-elevational view (parts broken away)

2 of a combine including a beater drum provided with a variable-speed drive according to our invention;

Figure 1:
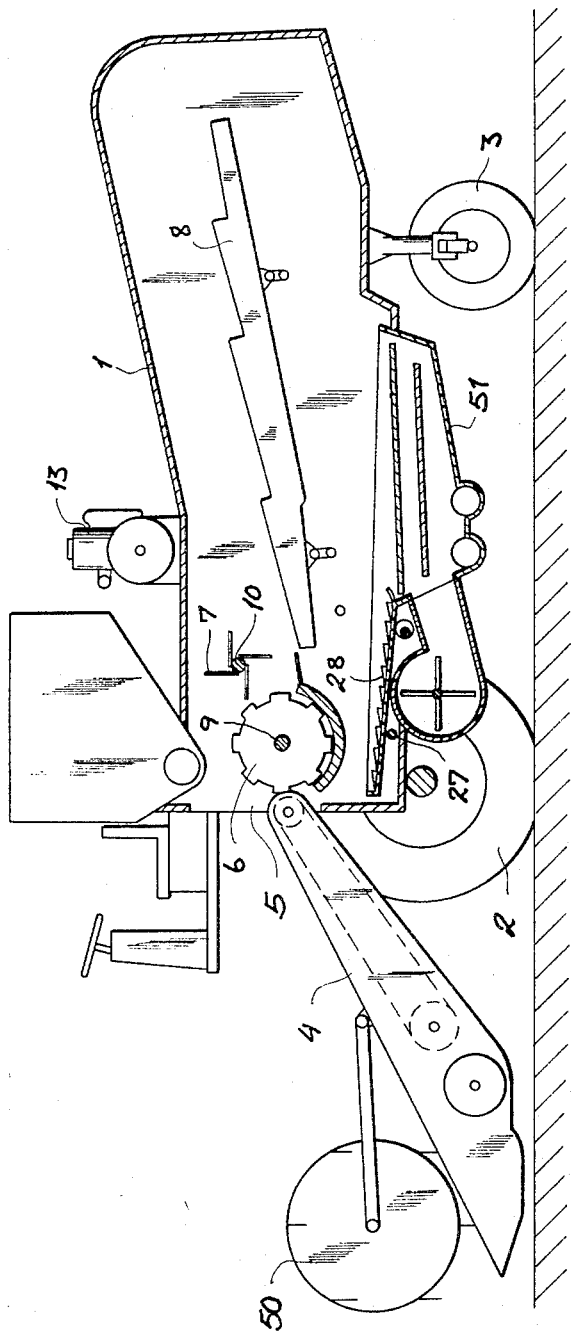
Figure 2:
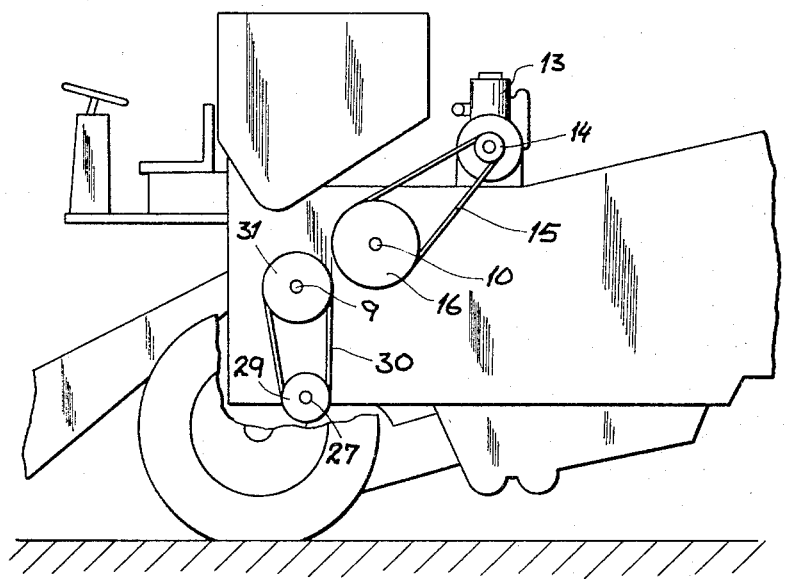
FIG. 2 is a fragmentary view of one side of the vehicle shown in FIG. 1.
Figure 3:
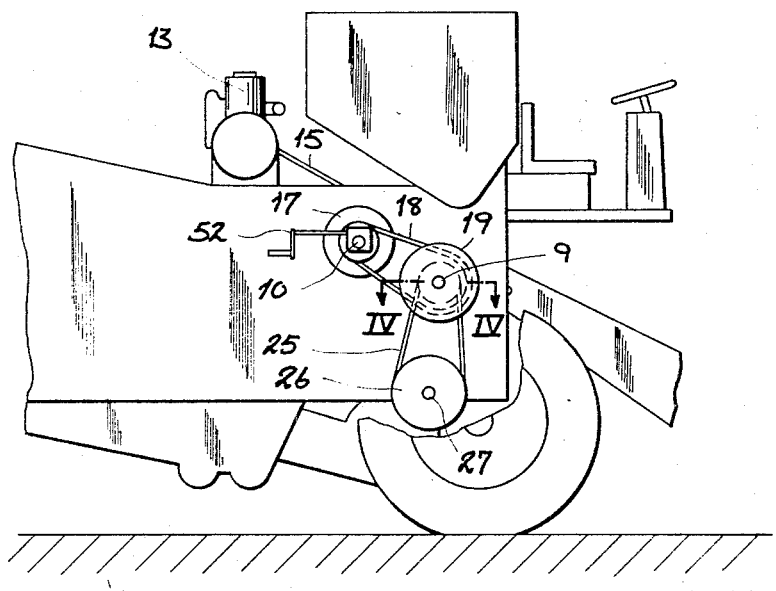
FIG. 3 is a view similar to FIG. 2, showing the vehicle from the opposite side.

In FIGS. 1–3 we have shown a combine in the form of a vehicle having a housing 1 on traction wheels 2 and steering wheels 3. A motor 13, which may also be the power source for the traction wheels 2, drives the movable elements of the combine including a conveyor 4 with pick-up reel 50, a beater drum 6 on a power shaft 9 which receives the crops from conveyor 4 at an entrance 5 of the housing, and a transfer drum 7 delivering the stalks from drum 6 to a vibrating riddle 8 whence the kernels are deposited in a receptacle 51. A stepped shelf 28 forms an extension of receptacle 51 toward which it slopes from a location below drum 6.

Figure 4:
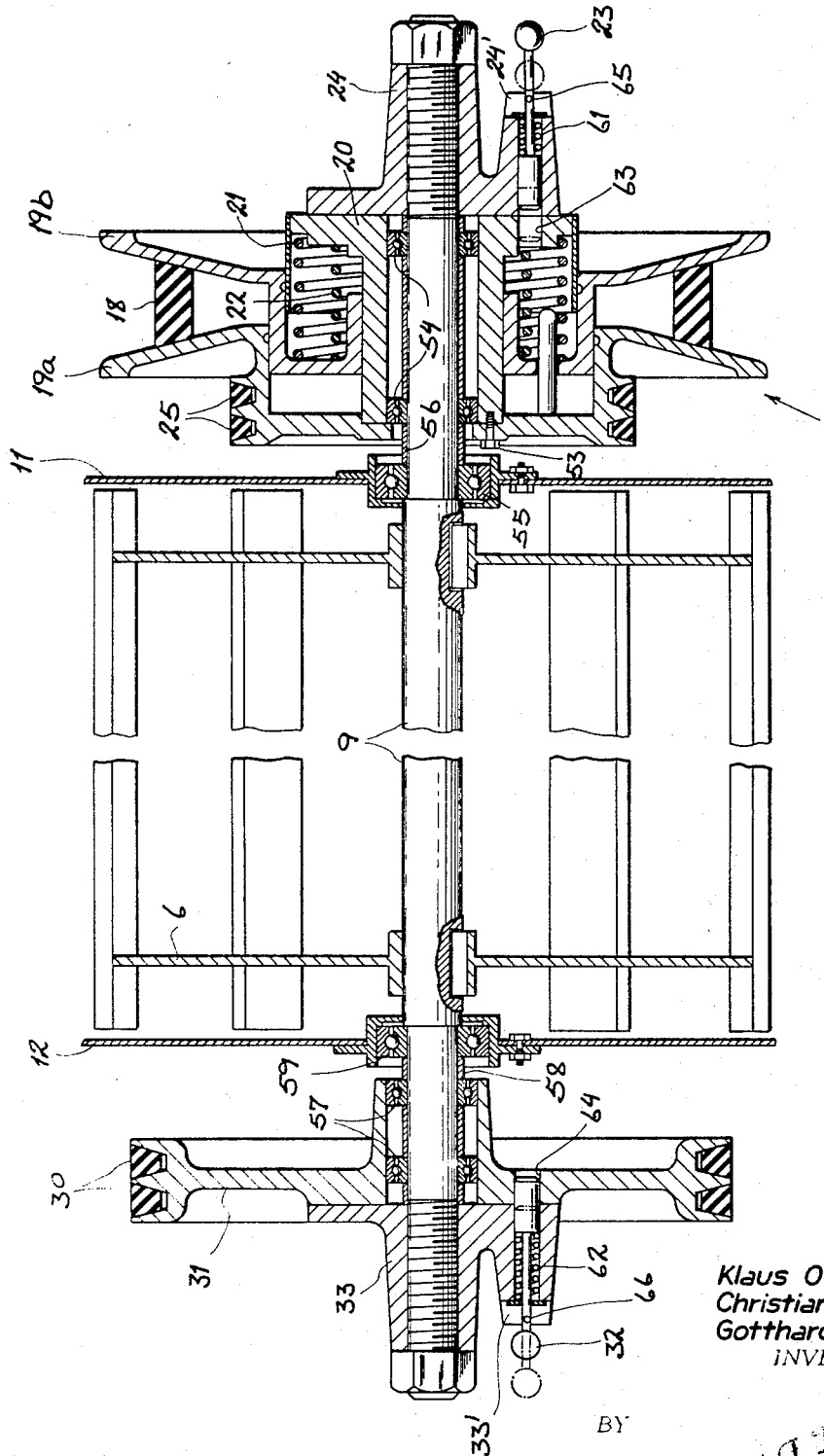
FIG. 4 is a cross-sectional detail view taken on the line IV—IV of FIG. 3 but drawn to a larger scale.

Motor 13 drives a pulley 14 linked via a belt 15 with a sheave 16 on an input shaft 10 which is journaled in the walls of housing 1. A Reeves pulley 17, split into two frustoconical halves whose axial separation on shaft 10 is adjustable by a hand crank 52, is carried by this shaft on the side of housing 1 opposite sheave 1b and is in turn connected by way of a V-belt 18 with a generally similar driven pulley 19 loosely mounted on drum shaft 9. As best seen in FIG. 4, pulley 19 has two frustoconical halves 19a, 19b of which the former is secured by screws 53 to a hub 20 engaging the shaft 9 through ball bearings 54. A pair of coaxial springs 21, 22 bear upon hub 20 and upon a confronting portion of pulley half 19b, slidably carried on the hub, to urge this half toward the other half 19a. A nut 24 engages a threaded extremity of shaft 9, thereby clamping the assembly 19, 20 in axially fixed position on the shaft 9 against the inner race of a bearing 55 with interposition of a spacing sleeve 56, the outer races of bearings 54 being rigid with hub 20. In a similar manner, a nut 33 on the opposite shaft extremity retains a pulley 31 on the shaft on which it is rotatably mounted by means of ball bearings 57 separated by a spacing sleeve 58 from another ball bearing 59. Bearings 55 and 59 are mounted in partitions 11, 12 between which the drum 6 is carried on the shaft 9.

Tension of the belt 18 tends to separate the pulley halves 19a, 19b against the biasing force of springs 21 and 22, it being apparent that this belt will always tend to engage the pulley 19 along the largest diameter consistent with the setting of Reeves pulley 17. The speed of driven pulley 19 may thus ve varied by adjusting the spacing of the halves of driving pulley 17. In a practical embodiment, the range of variation R may lie between about 1:2 and 1:3, e.g. with a minimum speed of 540 and a maximum speed of 1275 r.p.m.

Pulley half 19a has a grooved hub portion gripped by a pair of V-belts 25 which form part of a step-down linkage also including a pulley 26 engaged by these V-belts, this pulley being keyed to a shaft 27 extending underneath the shelf 28 to the other side of housing 1 where it has keyed to it another, smaller pulley 29 connected via similar V-belts 30 with the pulley 31 as part of a second step-down linkage. The combined ratio of the two linkages is advantageously equal to the aforementioned range R so that the shaft 9 rotates at the same speed, e.g. 540 r.p.m., when it is directly coupled to pulley 19 rotating at minimum speed and when it is coupled via linkages 25, 26 and 29–31 with that pulley rotating at maximum speed. The overall range, therefore, is extended downwardly to approximately 230 r.p.m., this being the speed of shaft 9 when pulley 19 is driven at its minimum rate and is coupled with the shaft by way of the two step-down linkages.

The selective coupling of shaft 9 with the pulley 19 by a direct connection or through the step-down linkages is accomplished with the aid of two manually operable pins 23 and 32 which are slidably received in bosses 24', 33' of nuts 24 and 33, respectively, and are urged inwardly by respective biasing springs 61, 62 for engagement in recesses 63, 64 of hub 20 and pulley 31, respectively. Transverse studs 65, 66 on pins 23 and 32 allow these pins to be indexed, upon a rotation through 90°, in a withdrawn position in which these studs rest in notches of a bifurcate extremity of the respective boss 24', 32'.

Naturally, not more than one of the pins 23, 32 may be engaged at any one time if the transmission is not to be blocked.

Figure 5:
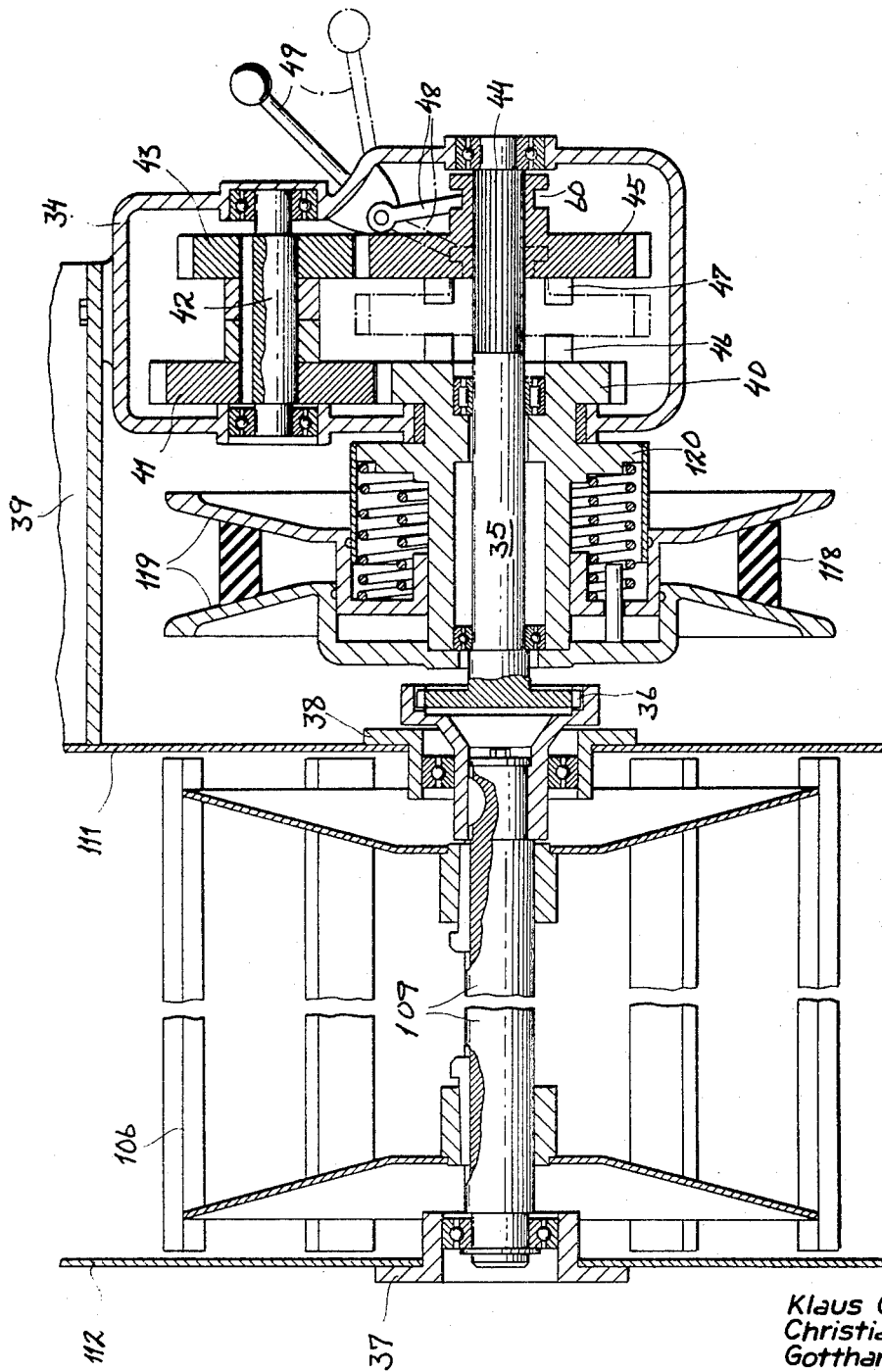
FIG. 5 is a view similar to FIG. 4, illustrating a modification.

In FIG. 5 we have shown an alternate arrangement wherein the shaft 109 of drum 106, journaled in partitions 111 and 112 via bearings 38 and 37, has an extension 35 secured to it via a coupling flange 36 to which it may be attached with a certain amount of angular play. A support 39, forming part of the machine housing, is rigid with partition 111 and carries an enclosure 34 which houses a double step-down transmission consisting of meshing gears 40, 41 and 43, 46. Gears 41 and 43 are keyed to an auxiliary shaft 42 journaled in transmission housing 34, gear 40 being rigid with hub 120 of pulley 119 whereas gear 45 is slidable on a splined extremity 44 of shaft extension 35. A lever 49, swingably mounted in the transmission housing 34, has an arm 48 which engages in a notch 60 of gear 46 for sliding it into one or the other of two alternate positions, i.e. a first position (full lines) in engagement with pulley 43 and a second position (dot-dash lines) disengaged from that pulley but in positive contact with gear 40 via mating clutch teeth 46 and 47. Lever 49 is indexable, by conventional means not shown, in its two operating positions in which Reeves pulley 119, driven from the pulley 17 (FIG. 3) via a belt 118, is coupled with shaft 109 either directly through jaw clutch 46, 47 or by way of the step-down transmission 40, 41, 43, 45. The tooth ratio of the gears of this transmission may again be so selected that the transmission ratio substantially corresponds to the range of speed variation obtainable from the Reeves drive.

Various modifications of the specific arrangements described and illustrated are, of course, possible without departing from the spirit and scope of our invention as defined in the appended claims.

We claim:
1. A variable-speed drive for a beater drum of a threshing machine, comprising a power shaft for said unit, variable-speed transmission means including a driven element loosely mounted on said shaft, first coupling means for positively connecting said element directly with said shaft, second coupling means for positively connecting said element with said shaft via a speed-reducing transmission, and selector means for alternatively making said coupling means effective, said speed-reducing transmission including an auxiliary shaft extending parallel to the drum axis, a first step-down linkage from said driven element to said auxiliary shaft, and a second step-down linkage from said auxiliary shaft to another element mounted on said power shaft on the side of said drum opposite said driven element.

2. A variable-speed drive for a beater drum of a threshing machine, comprising a power shaft for said unit, variable-speed transmission means including a driven element loosely mounted on said shaft, first coupling means for positively connecting said element directly with said shaft, second coupling means for positively connecting said element with said shaft via a speed-reducing transmission, and selector means for alternatively making said coupling means effective, said speed-reducing transmission including a gear train disposed on one side of said drum, on an extension of said shaft beyond said element, and clutch means keyed to said extension, said clutch means being shiftable by said selector means between a first position in engagement with said element and a second position in engagement with a gear of said gear train.

3. A drive as defined in claim 2, further comprising a common housing for said extension, said clutch means and said gear train.

4. A variable-speed drive for a rotatable unit of an agricultural implement, comprising a power shaft for said unit, variable-speed transmission means including a driven element loosely mounted on said shaft, first coupling means for positively connecting said element directly with said shaft, second coupling means for positively connecting said element with said shaft via a speed-reducing transmission, and selector means for alternatively making said coupling means effective, said transmission means including a split double-cone driving pulley with continuously adjustable separation between its halves, said driven element being another split pulley with conical halves spring-urged toward each other, and a V-belt interlinking said pulleys.

5. A drive as defined in claim 4 wherein said speed-reducing transmission has a step-down ratio substantially equal to the range of variation in the speed of said driven pulley obtainable by adjustment of the separation of the halves of said driving pulley.

6. A drive as defined in claim 5 wherein said step-down ratio ranges between substantially 1:2 and 1:3.

References Cited
UNITED STATES PATENTS

| | | | |
|---|---|---|---|
| 2,150,456 | 3/1939 | Perrine | 74—230.17 |
| 2,488,892 | 11/1949 | Arzt | 74—722 |
| 2,703,161 | 3/1955 | Keim et al. | 74—722 |
| 3,354,748 | 11/1967 | Chapman | 74—230.17 |

C. J. HUSAR, *Primary Examiner.*